UNITED STATES PATENT OFFICE.

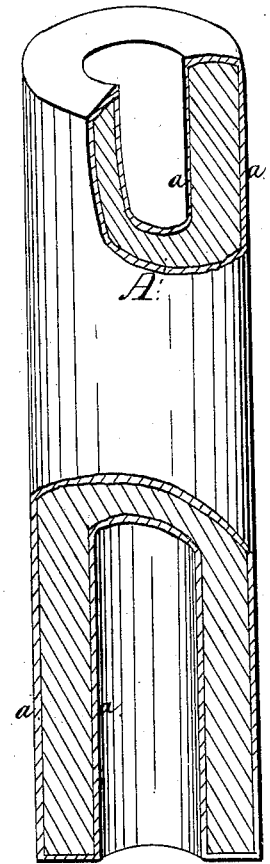

ARCALOUS WYCKOFF, OF ELMIRA, NEW YORK.

IMPROVED PIPE FOR GAS, WATER, &c.

Specification forming part of Letters Patent No. 45,201, dated November 22, 1864.

*To all whom it may concern:*

Be it known that I, A. WYCKOFF, of Elmira, in the county of Chemung and State of New York, have invented a new and useful Improvement in Gas and Water Pipes; and I do hereby declare that the following is a full, clear, and exact description thereof, which will enable those skilled in the art to understand and use the same, reference being had to the accompanying drawing, which represents a sectional side elevation of a pipe.

This invention consists in the application or use of a composition of sawdust and hard-boiled tar in combination with wooden pipes in such a manner that by coating said pipes on the inside and outside with the composition the wood is rendered perfectly impervious to water or gas and preserved against the injurious influence of moisture from the inside or outside.

Wooden pipes, when not protected by a water-tight coating, are not fit to hold gas or water, and when used for that purpose they are liable to rot in a short time, and they prove a continuous source of trouble and expense. In order to avoid these difficulties I coat said wooden pipes with a composition made in the following manner:

I boil coal or gas tar to such a consistency that it will become hard when cooled and mix it with sawdust in about the following proportions: Coal-tar, ten parts; sawdust, one part, and this composition, while hot, I apply to the pipes both inside and out for gas and outside only for water.

Instead of mixing the coal-tar with sawdust previous to applying the composition to the pipes the coal-tar, after having been boiled, may be applied first and the sawdust sprinkled over it; or, instead of this, the pipes, after having been coated with tar and before said tar has set, may be rolled in sawdust to take up enough to prevent the pipes from sticking together when piled up, or to the hands when handled before the composition is perfectly hard.

When coated on the inside and out, the pipe A will have an appearance as shown in the drawing, where *a a* represent the coat of tar and sawdust.

It is obvious that my composition may be used for wooden pipes of any description, round or square, and by its application said pipes will be rendered perfectly gas and water tight and protected against the injurious influence of moisture.

What I claim as new, and desire to secure by Letters Patent, is—

The combination of a composition of hard-boiled tar and sawdust with wooden pipes, applied in the manner and for the purpose set forth.

ARCALOUS WYCKOFF.

Witnesses:
  D. H. WICKS,
  O. W. WYCKOFF.